Oct. 1, 1929.  A. PURDIE  1,729,895

FILET FOR VEHICLE WHEELS

Filed April 23, 1928

Inventor
Alexander Purdie,
By
Attorneys

Patented Oct. 1, 1929

1,729,895

UNITED STATES PATENT OFFICE

ALEXANDER PURDIE, OF WYANDOTTE, MICHIGAN

FILET FOR VEHICLE WHEELS

Application filed April 23, 1928. Serial No. 272,270.

The present invention pertains to a novel filet for vehicle wheels, and the principal object is to provide a device to prevent the entry and accumulation of dirt in the angles between the spokes of a wheel, where it cannot be readily wiped or washed out.

It will be observed in the use of a wheeled vehicle, particularly a motor car, that mud or dust mixed with a grease becomes embedded or encrusted in said angles and crevices formed by the spokes of the wheel and associated parts, and it is practically impossible to wash these spaces clean of dirt by the ordinary available means.

In overcoming this difficulty I provide a filet or corner member formed to enter the angle between the spokes. At the vertex of this member is a concave shield which presents a surface easily accessible by any washing or dusting device. The legs of the angular member are similarly bent or rounded to close the spaces between the brake drum and the spokes and to present a surface which can readily be washed.

The invention is fully disclosed by way of example in the following description and in the accompanying drawing, in which—

Reference to these views will now be made by use of like characters which are employed to designate corresponding parts throughout.

Figure 1:
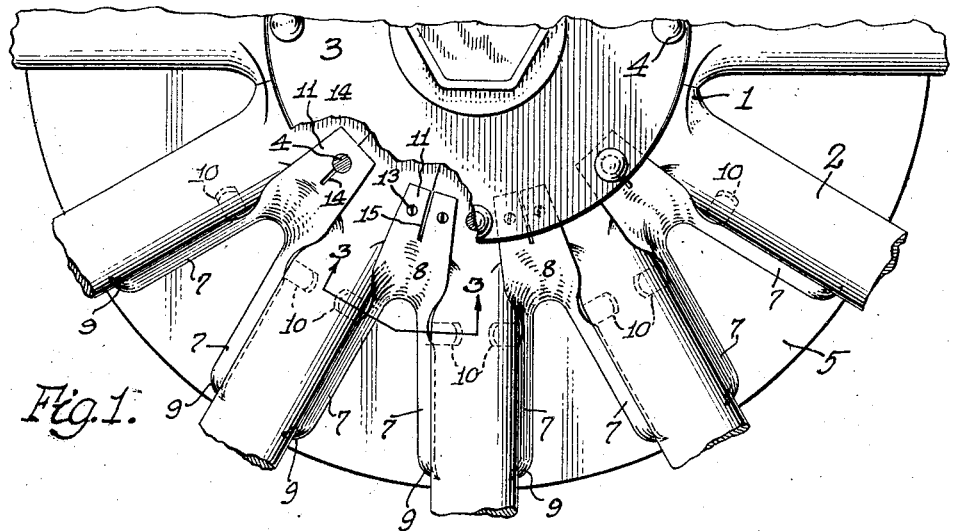
Figure 1 is a fragmentary perspective view of an automobile wheel having the device of the invention applied thereto.

In Figure 1 is illustrated an automobile wheel comprising a hub 1 from which radiate a plurality of spokes 2. A hub plate 3 is secured over the hub in the usual manner by means of suitable bolts 4. The wheel carries a brake drum 5 at the inner side of the spokes in a manner well known in this art, and the wall of this drum forms a narrow space 6 with each spoke 2.

The spaces 6 as well as the angles formed by the spokes cannot be reached by the ordinary washing means for the complete removal of dirt, grease and mud therefrom. In avoiding this difficulty I provide an angular member comprising a pair of legs 7 and a shield 8 at the vertex. The angle of this member is equal to the angle between the spokes, and the shield 8 fits into the vertex of the latter angle. As viewed in Figure 1, this shield is bent to a concave formation whereby it presents a surface which has no sharp corners and which may readily be reached by any ordinary cleaning device.

The legs 7 are also concave or bent inwardly on a longitudinal line whereby to close the spaces 6 and present smooth surfaces which may readily be cleaned. The ends 9 of the legs 7 are pointed and bent outwardly to enter the spaces 6 and occupy a somewhat transverse position therein. An end closure is thus formed for the spaces 6 at the outer edge of the brake drum wall, and the peculiar formation of the ends 9 avoids the catching and tearing of a cleaning rag which may be used on the parts of the spokes extending beyond the periphery of the brake drum.

The angular member has a pair of pointed wedge shaped members 10 extending outwardly therefrom near the vertex thereof. These members are forced into the spaces 6 and are firmly held therein by friction. This constitutes in part the securing means of the filet to the wheel.

Figures 2, 3, 4:
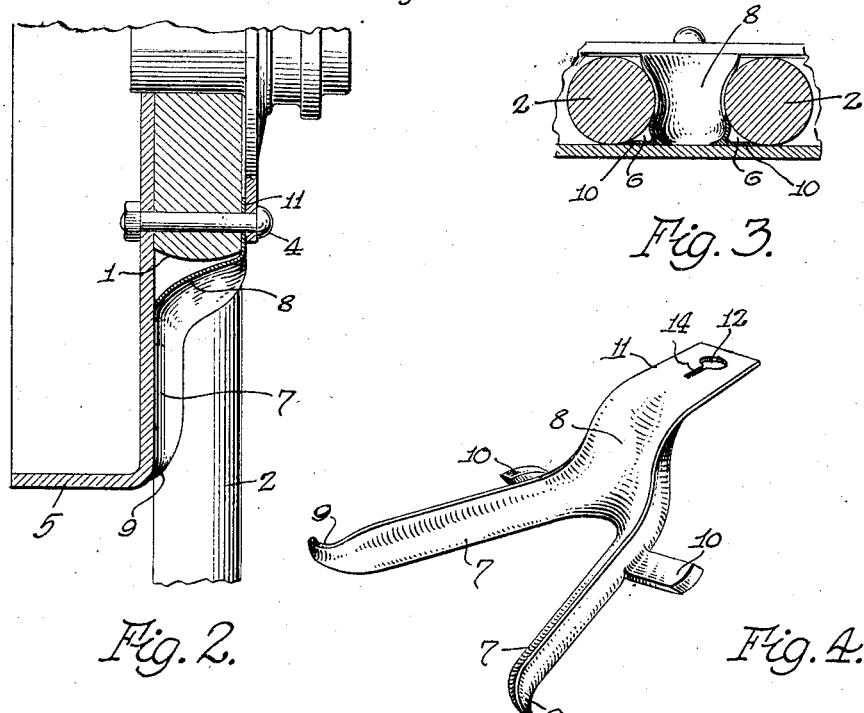
Fig. 2 is a fragmentary diametrical section thereof.
Fig. 3 is a section on the line 3—3 of Figure 1.
Fig. 4 is a perspective view of the filet.

A lug 11 extends from each of the shields 8 and lies between the hub 1 and the plate 3 as illustrated in Figures 1 and 2. Certain of these lugs lie in the path of certain of the bolts 4, and in such cases are apertured as at 12 in order to be penetrated by the bolts. Otherwise, the lug is merely secured to the hub by screws 13. In either case the lug is slit in order to permit a yieldability in response to the stresses and strains set up in the legs 7. Where the lug is traversed by the bolt 4, the slit 14 extends as far as the bolt hole 12. In the other case, the slot 15 extends between the two screws and as far as the outer edge of the lug.

Although a specific embodiment of the invention has been illustrated and described, it will be understood that various alterations in the details of construction may be made without departing from the scope of the invention as indicated by the appended claim.

What I claim is:—

A filet comprising an angular member adapted to be fitted in the angle between the spokes of a wheel, the legs of said member being formed to close the spaces between said spokes and an adjacent brake drum, and a shield at the vertex of said member adapted to fit over an adjacent hub, said shield being slotted in a line, the prolongation of which passes between said legs.

In testimony whereof I affix my signature.

ALEXANDER PURDIE.